United States Patent
Lau

(10) Patent No.: US 12,009,605 B2
(45) Date of Patent: Jun. 11, 2024

(54) METHODS AND SYSTEMS FOR REDUCING SPHERICAL ABERRATION

(71) Applicant: THE AEROSPACE CORPORATION, El Segundo, CA (US)

(72) Inventor: Anthony Y. Lau, Chantilly, VA (US)

(73) Assignee: THE AEROSPACE CORPORATION, El Segundo, CA (US)

(*) Notice: Subject to any disclaimer, the term of this patent is extended or adjusted under 35 U.S.C. 154(b) by 0 days.

(21) Appl. No.: 16/678,798

(22) Filed: Nov. 8, 2019

(65) Prior Publication Data
US 2021/0143546 A1    May 13, 2021

(51) Int. Cl.
| | | |
|---|---|---|
| H04B 1/10 | (2006.01) | |
| H01Q 3/24 | (2006.01) | |
| H01Q 3/28 | (2006.01) | |
| H01Q 3/38 | (2006.01) | |
| H01Q 3/46 | (2006.01) | |
| H01Q 19/10 | (2006.01) | |
| H01Q 21/00 | (2006.01) | |
| H04B 7/185 | (2006.01) | |
| H04B 7/204 | (2006.01) | |
| H04B 7/212 | (2006.01) | |

(52) U.S. Cl.
CPC ............. *H01Q 3/46* (2013.01); *H01Q 3/24* (2013.01); *H01Q 3/28* (2013.01); *H01Q 3/38* (2013.01); *H01Q 19/10* (2013.01); *H01Q 21/0025* (2013.01); *H04B 1/1081* (2013.01)

(58) Field of Classification Search
None
See application file for complete search history.

(56) References Cited

U.S. PATENT DOCUMENTS

| | | | | |
|---|---|---|---|---|
| 5,459,475 A | | 10/1995 | Shen et al. | |
| 5,936,592 A | * | 8/1999 | Ramanujam | H01Q 25/007 343/778 |
| 6,204,822 B1 | * | 3/2001 | Cardiasmenos | H01Q 25/007 343/761 |
| 6,268,835 B1 | * | 7/2001 | Toland | H01Q 1/08 343/781 P |
| 6,320,509 B1 | * | 11/2001 | Brady | G08B 13/2442 340/572.7 |

(Continued)

OTHER PUBLICATIONS

Bahadori, K., et al., "An Array-Compensated Spherical Reflector Antenna for a Very Large Number of Scanned Beams", IEEE Transactions on Antennas and Propagation, 2005, vol. 53, No. 11, pp. 3547-3555.

*Primary Examiner* — Pablo N Tran
(74) *Attorney, Agent, or Firm* — One LLP

(57) ABSTRACT

Due to its geometry, spherical reflector antenna is inherently diffractive, leading to spherical aberration. Disclosed are example embodiments of methods and systems to minimize or eliminate spherical aberration in a spherical reflector antenna system. One of the systems includes: a main spherical reflecting dish; and a spherical feed having a plurality of antenna elements disposed on a spherical surface. The plurality of antenna elements can be disposed on a convex surface of the spherical surface of the spherical feed facing the main spherical reflecting dish.

17 Claims, 14 Drawing Sheets

(56) References Cited

U.S. PATENT DOCUMENTS

| | | | | |
|---|---|---|---|---|
| 6,686,889 B1 * | 2/2004 | Kwon | ............... | H01Q 1/125 |
| | | | | 342/359 |
| 6,714,165 B2 * | 3/2004 | Verstraeten | ............ | H01P 1/161 |
| | | | | 343/772 |
| 9,565,372 B2 | 2/2017 | Cook | | |
| 10,658,757 B2 * | 5/2020 | Jackson | ............... | H01Q 19/191 |
| 2010/0271681 A1 * | 10/2010 | Valach | ............... | F24S 23/71 |
| | | | | 359/216.1 |
| 2017/0133754 A1 * | 5/2017 | Raeker | ............... | H04B 5/0012 |
| 2017/0288769 A1 * | 10/2017 | Miller | ............... | H04B 7/212 |
| 2017/0324171 A1 * | 11/2017 | Shehan | ............... | H01Q 1/246 |
| 2018/0198214 A1 * | 7/2018 | Walker | ............... | H01Q 19/15 |
| 2019/0028165 A1 * | 1/2019 | Adachi | ............... | H01Q 19/17 |
| 2020/0091608 A1 * | 3/2020 | Alpman | ............... | H01Q 21/24 |

* cited by examiner

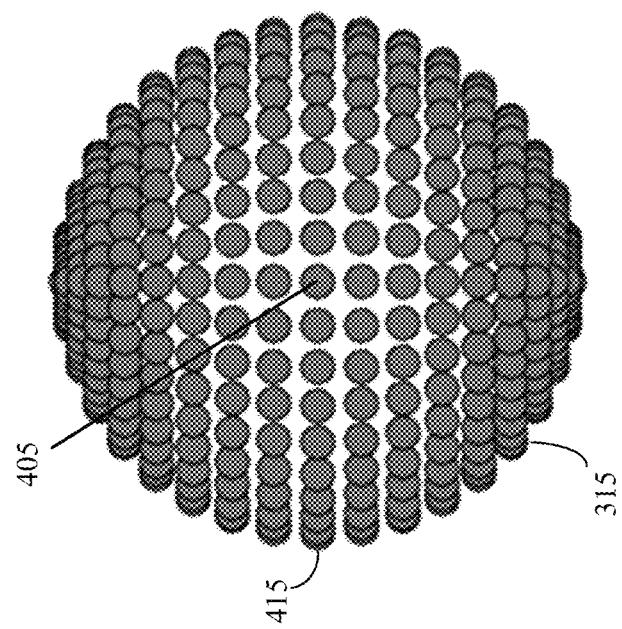
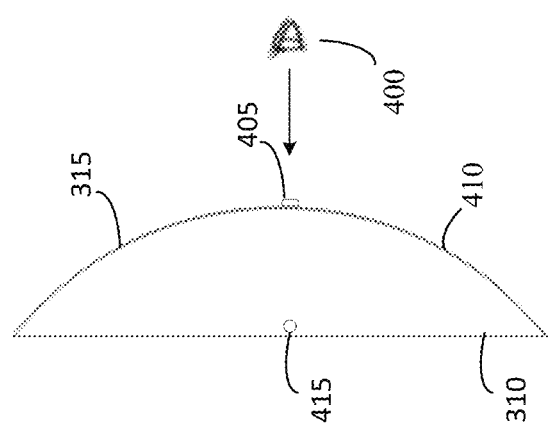
FIG. 4A

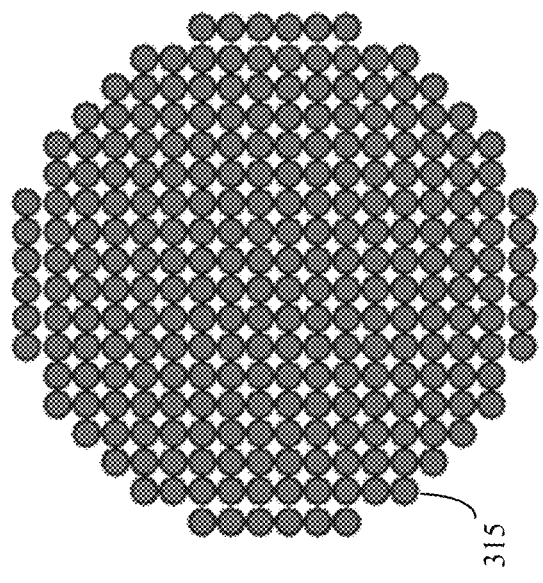
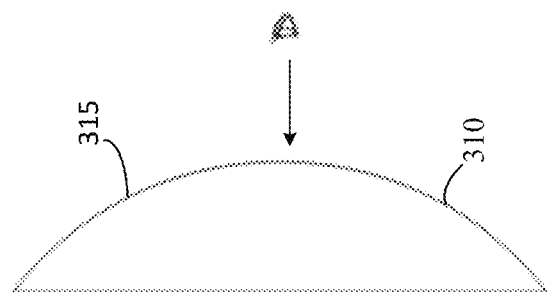
FIG. 4B

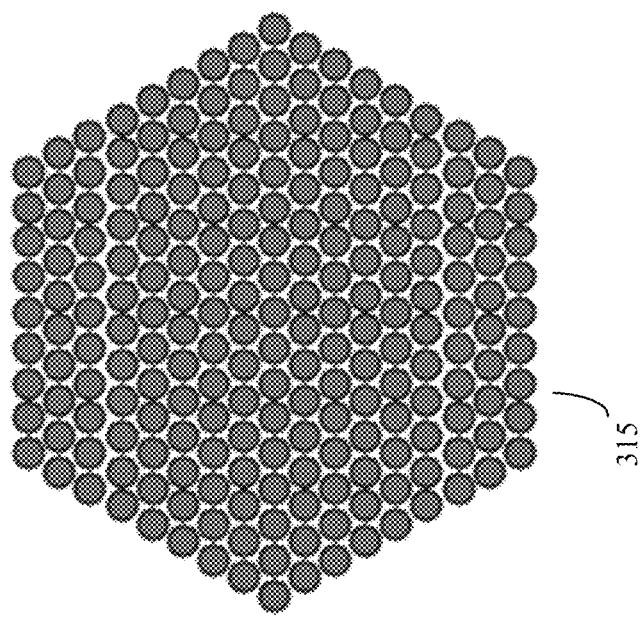
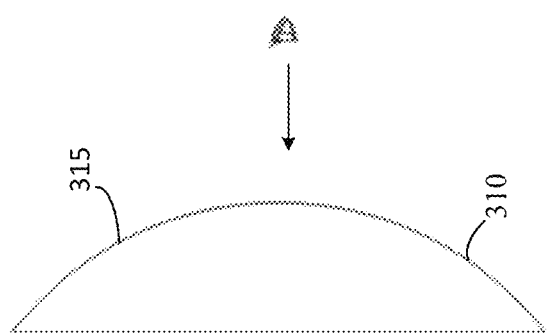
FIG. 4C

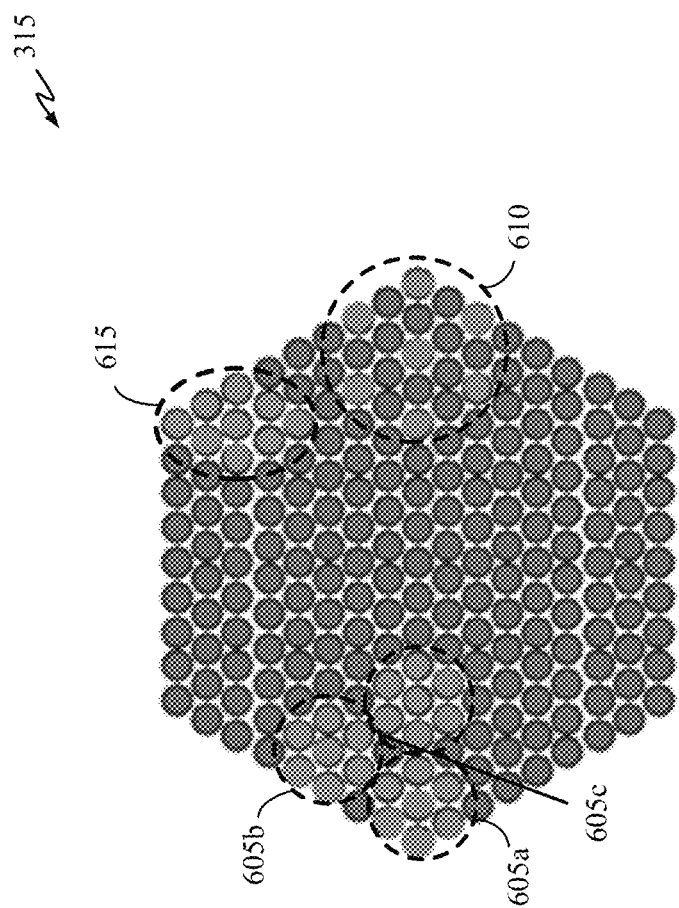

METHODS AND SYSTEMS FOR REDUCING SPHERICAL ABERRATION

STATEMENT REGARDING FEDERALLY-SPONSORED RESEARCH OR DEVELOPMENT

This invention was made with government support under Contract No. FA8802-19-C-0001 awarded by the Department of the Air Force. The government has certain rights in the invention.

BACKGROUND

Reflector antennas can have two different types of primary mirror, parabolic and spherical. A parabolic reflector antenna, as the name suggests, uses a parabolic primary mirror. It is primarily used in high frequencies applications. The biggest advantage of a parabolic mirror is the single focal point. When designed and manufactured properly, parabolic mirror focuses all incoming parallel signals (e.g., light, radiation) to a single focal point. This is desirable because the collected (e.g., cumulative) signal is focused and therefore has minimal interference. Conversely, for transmission, waves from a single focal point can be transmitted by the parabolic mirror as a single collimated wave front. However, some of the biggest drawbacks of parabolic mirrors are its design complexity and manufacturing cost. In general, the parabolic shape of the primary mirror is hard to design and expensive to produce because the grinding process for a parabolic mirror is labor intensive and complex.

Spherical reflector antenna uses a spherical primary mirror, which is easier to design and manufacture than a parabolic mirror. Another advantage of spherical mirrors is their wide field of view. This is because spherical mirrors have the inherent ability to redirect parallel and non-parallel signals to a feed area. However, the feed area for a spherical mirror can have multiple focal points, which is the nature of spherical aberration.

SUMMARY OF THE INVENTION

Disclosed are example embodiments of methods and systems to minimize or eliminate spherical aberration in a spherical reflector antenna system. One of the systems includes: a main spherical reflecting dish; and a spherical feed having a plurality of antenna elements disposed on a spherical surface The spherical feed can be disposed on an axis of the main spherical reflecting dish. The plurality of antenna elements can be disposed on a convex surface of the spherical surface facing the main spherical reflecting dish. The convex surface of the spherical feed can have a surface area that is no more than half of a surface area of a sphere.

The system can also include a beamforming module configured to activate one or more groups of antenna elements of the plurality of antenna elements based at least on a scanning sequence or an activation pattern. The beamforming module can also be configured scan a first portion of the main spherical reflecting dish by activating one or more groups of antenna elements of the plurality of antennas to electronically point in a direction of the first portion of the main spherical reflecting dish. The beamforming module can also be configured to scan a portion of the main spherical reflecting dish by activating the one or more groups of antenna elements of the plurality of antennas based at least on a phase gradient or scanning pattern.

Also disclosed is a method for compensating spherical aberration in a spherical reflector antenna system. The method includes: receiving electromagnetic (EM) signals using a 3D antenna array disposed on a spherical feed, wherein the EM signals are reflected from a spherical reflector; and beamforming one or more groups of antenna elements of the 3D antenna array to modify the received EM signals.

Beamforming the one or more groups of antenna elements can be accomplished by activating one or more groups of antenna elements based at least on a scanning sequence. Beamforming the one or more groups of antenna elements can also be accomplished by activating one or more antenna elements within a group of antenna element. Each group of antenna elements can have a plurality of antenna elements. Beamforming can be done using an analog or digital beamforming process.

Also disclosed is a spherical reflector antenna system. The system includes: a main spherical reflector; a plurality of antenna elements disposed on a spherical surface of a feed, the plurality of antenna elements configured to receive reflected electromagnetic waves from the main spherical reflector; and a beamforming module configured to activate one or more groups of antenna elements of the plurality of antenna elements based at least on an activation pattern. The activation pattern is configured to minimize spherical aberration of the spherical reflector.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

FIGS. 4A, 4B, and 4C illustrate examples 3D antenna arrays in accordance with some embodiments of the present disclosure.

FIG. 6 illustrates examples antenna local groups in accordance with some embodiments of the present disclosure.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

Figure 1:
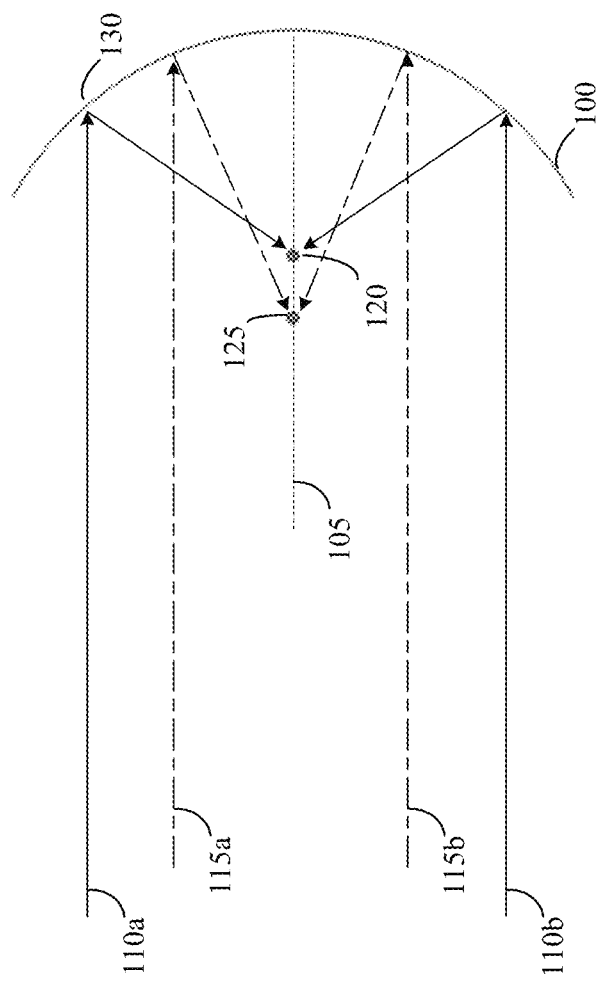
FIG. 1 illustrates pathways of electromagnetic (EM) waves in a spherical reflector system.

FIG. 1 is a diagram depicting the travel paths of parallel electromagnetic (EM) signals of a spherical reflector 100. A spherical reflector is a reflector that takes its shape from a portion of a sphere. As shown in FIG. 1, EM signals entering reflector 100 that are farther from the reflector's central axis 105 will reflect to a focal point closer to the vertex of reflector 100. Similarly, EM signals entering reflector 100 that are closer to central axis 105 will reflect to a focal point farther away from the vertex of reflector 100. For example, EM signals 110a and 110b both reflect to focal point 120, and EM signals 115a and 115b both reflect to focal point 125, which is farther away from the vertex than focal point 120.

Figure 2:
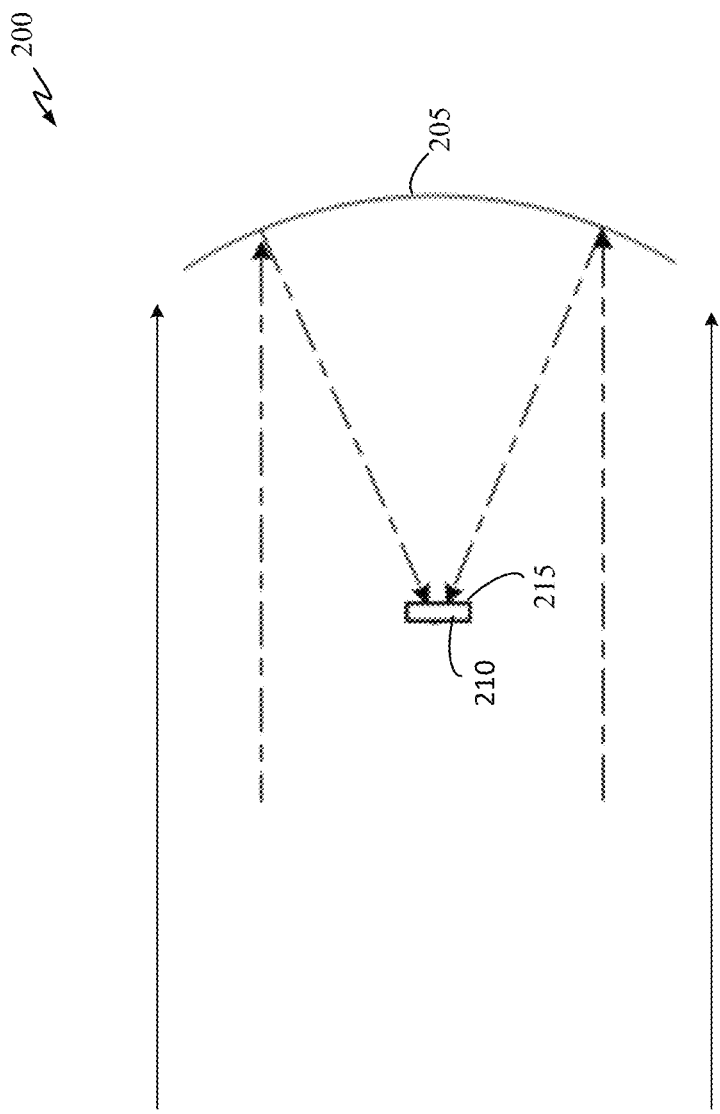
FIG. 2 illustrates a conventional spherical reflector antenna system.

Spherical aberration occurs because reflector 100 has multiple focal points. For example, a feed at focal point 120 can still receive EM signals 115a and 115b. However, because EM signals 115a and 115b have a different focal point, the signals received by the feed at focal point 120 will be distorted (e.g., out of focus), which can lead to interference. Similarly, a feed at focal point 125 can still receive unfocused signals reflected from area 130 of reflector 100 since EM signals reflected from area 130 have a focal point at 120. FIG. 2 illustrates a conventional spherical reflector antenna 200 having a shorter main reflecting dish 205. Reflector antenna 200 includes feed 210 placed at a focal point where paraxial EM signals converge. Main reflector 205 has the same radius as main reflector 100 but is made with a small aperture to minimize non-paraxial EM signals from reaching feed 210. Non-paraxial EM signals are incoming signals outside of an axial boundary of main reflector 205 whose reflections converge at a different focal point than the location of feed 210, which has a planar antenna array 215 disposed on a planar surface of feed 210. As shown, one way of minimizing spherical aberration in conventional art is to make the main reflecting dish have a small aperture. However, this solution is not truly desirable because a smaller aperture leads to smaller resolving power. For instance, the gain of reflector antenna 200 is greatly reduced due to the loss of the surface area of the main reflector when a smaller aperture is employed.

Spherical Reflector Antenna

Figure 3:
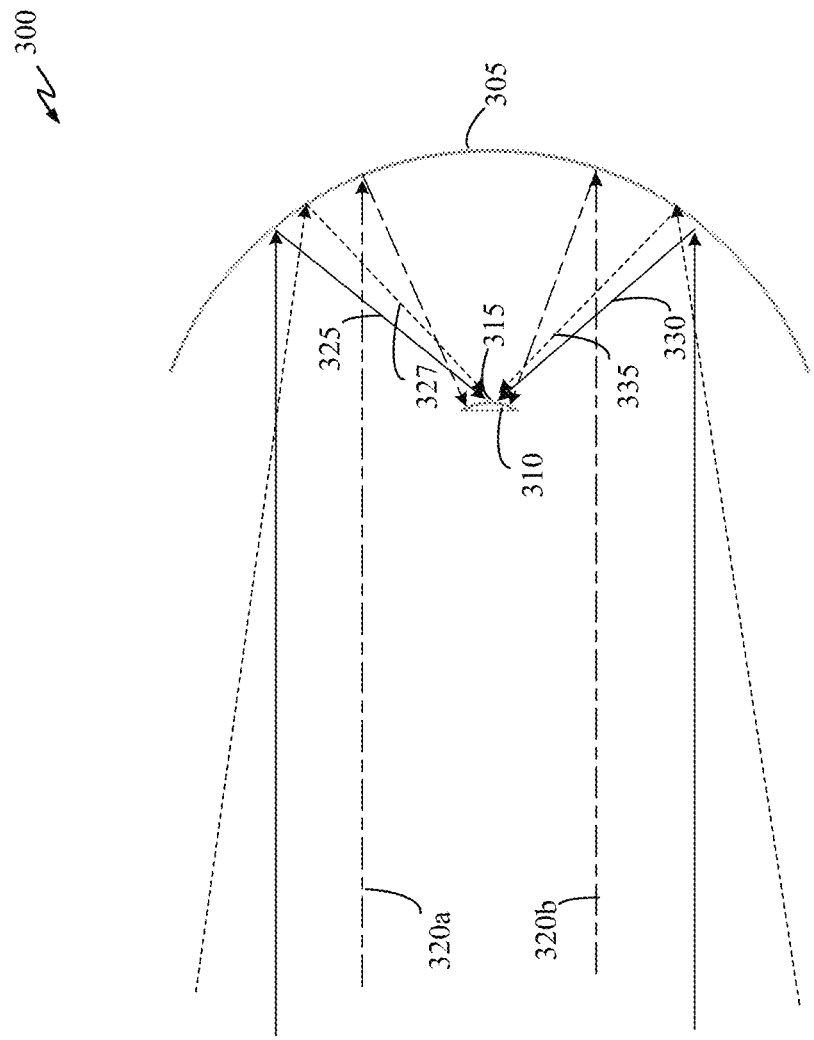
FIG. 3 illustrates a spherical reflector antenna system in accordance with some embodiments of the present disclosure.

FIG. 3 illustrates a spherical reflector antenna 300 with a spherical feed in accordance with some embodiments of the present disclosure. Reflector antenna 300 includes a spherical reflector 305, a spherical feed 310, and non-planar antenna array 315. Spherical reflector 305 can have a large aperture. In some embodiments, spherical reflector 305 can have a surface area equaling half of a surface area of a sphere. In other words, a cross-sectional view of spherical reflector 305 would resemble a half circle.

Spherical feed 310 can be disposed at a focal point where paraxial rays 320a and 320b converge. Spherical feed 310 has a non-planar surface 315 such as, but not limited to, a portion of a spherical surface, a portion of a polyhedron, a portion of a paraboloid, or a conical surface. In some embodiments, non-planar surface 315 can be a portion of sphere. Non-planar surface 315 of spherical feed 310 can be a convex surface facing spherical reflector 305. The size of non-planar surface 315 can be based on at least on an attribute of spherical reflector 305. For example, the size of non-planar surface 315 can be based on the diameter of spherical reflector 305. In another example, the size of non-planar surface 315 can be based on the main focal length of spherical reflector 305.

Non-planar antenna array 315 can be an array of antenna elements (see FIG. 4A). Non-planar antenna array 315 can be disposed to conform with the shape of non-planar surface. For example, if non-planar surface 315 is a portion of a spherical surface, then non-planar antenna array 315 can also have a 3D shape approximating a portion of a spherical surface. Non-planar antenna array 315 can have a distribution pattern (see FIGS. 4A, 4B, and 4C) disposed on non-planar surface 315. The distribution pattern can be a circular pattern, a hexagonal pattern, a polygonal pattern, or spiraling pattern, a combination thereof. The distribution pattern can also take a 3D shape to conform with the shape of non-planar surface 315.

Spherical aberration of reflector antenna 300 can be substantially reduced due to the spherical shape of feed 310 and antenna array 315. Each antenna element of antenna array 315 can be positioned on spherical feed 310 such that the distance between any point on reflector 305 and the closest antenna element to that point is the same. For example, spherical feed is constructed such that the lengths of paths 325 and 330 are the same. Since all antenna elements can be placed at the same distance to reflector 305, this enables image compensation module to reliably compensate for any aberration by adjusting one or more weights of one or more antenna elements. For example, a beamforming module can point antenna array 315 in the direction of ray 327 and adjust one or more of attributes of array 315 to compensate for any aberration. Similarly, the beamforming module can also point antenna array 315 in the direction of ray 335 and adjust one or more of attributes (e.g., phase, amplitude) of array 315 to compensate for any potential aberration. In this way, spherical aberration can be minimized with the spherical feed and antenna array. Additional methods for compensating spherical aberration are described below.

Non-planar antenna array 315 can have a plurality of local antenna groups. Each local group can be a collection of one or more individual antenna elements. For example, each local can have 3-12 antenna elements. In some embodiments, each local group can have 5 or 7 antenna elements. Each group within the plurality of local groups can have a distribution pattern that is different from the distribution pattern of an adjacent group. In other words, antenna array 315 can have on or more antenna distribution patterns. This can include varying spacings between antenna elements.

One or more local groups of antenna array 315 can be activated at a time. One or more local groups of antenna array 315 can also be activated based on an activation pattern (e.g., phase gradient). In some embodiments, beamforming can be accomplished via the activation and deactivation of one or more local groups of antenna elements of antenna array 115.

Beamforming can also be accomplished using a phase gradient method. A phase gradient is an activation profile based on a phase of a signal. A phase gradient can provide an activation pattern and timing of one or more local groups of antenna elements in order to perform beamforming. In some embodiments, a beamforming module can adjust the amplitude and/or phase of one or more antenna elements such that EM signals from a particular location of reflector 305 are add together to increase the signals from that particular location, while cancelling to suppress EM signals from other directions. The beamforming module can include digital or analog phase shifters configured to alter the phase of each antenna element electronically. The beamforming module can also include digital or analog amplifiers to increase the gain of a signal.

For instance, the beamforming module can activate one or more local groups of antenna elements based on a phase gradient (e.g., pattern and timing) to direct the one or more local groups of antenna elements at a certain angle. This, in effect, electronically steer the array in a certain direction. A phase gradient can also be an activation profile of one or more antenna elements within a local group. In other words, one or more antenna elements within a local group can form a phased array. A phased array can also be formed using antenna elements from one or more local groups. The amplitude and phase of each antenna elements of a phased array can be adjusted using digital signal amplifiers and phase shifters, respectively.

The radiation pattern of each antenna element of a phased array can be adjusted to constructively combine with radiation patterns of neighboring antennas to form a cumulative radiation pattern called the main lobe. The shape and size of the main lobe of a phased array (e.g., one or more local groups) can be controlled by a beamforming module such that the energy of the phased array is radiated in the desired location. Additionally, the beamforming module can configure the radiation pattern to destructively interfere with signals in undesired directions with nulls and side lobes.

The beamforming module can configure one or more local groups to maximize the energy radiated in the main lobe while reducing the energy radiated in the side lobes to a desired level. The phased array can be electronically steered (i.e., pointed in a certain direction) by adjusting the phase of signals of each antenna element of the phased array.

In some embodiments, the beamforming module can be an analog beamforming (ABF) module, which can use analog amplifiers and phase-shifters to amplify and change the phase of signals arriving at each of the antenna elements. The ABF module then sums the signals from all of the antenna elements and processes it as a single input using an analog to digital converter.

FIG. 4A is a front view of antenna array 315 having a spherical layout in accordance with some embodiments of the present disclosure. The front view of antenna array 315 is from a perspective location 400. As shown, antenna array 315 can be arranged in a circular-spherical pattern. Antenna element 405 is at the center of convex surface 410 of spherical feed 310. Convex surface 405 faces reflector 305, the direction in which EM waves are reflected to spherical feed 310. Antenna element 415 of antenna array 315 can be located on the edge of spherical feed 310 as shown in FIG. 4A. The size of each antenna element and the spacing between antenna elements can be based on the frequency spectrum of the EM waves to be observed.

FIGS. 4B and 4B are front views of antenna array 315 having various layouts in accordance with some embodiments of the present disclosure. The layout or the overall pattern of antenna array 315 can have different shape such as, but not limited to, a circle (FIG. 4A), an octagon (FIG. 4B), a hexagon (FIG. 4C), a square, a rectangle, or other polygonal shape. The number of antenna elements in antenna array 315 can depend on the application (e.g., optical or radio observation) and/or the expected operational frequency spectrum (e.g., infrared, x-ray). Antenna array 315 in FIGS. 4A, 4B, and 4C may appear to be a planar (2D) array because of the general layout and the perspective view from the front. Each of the array in FIGS. 4A, 4B, and 4C is a 3D array that conforms with the convex surface of spherical feed 315.

Figure 5A:
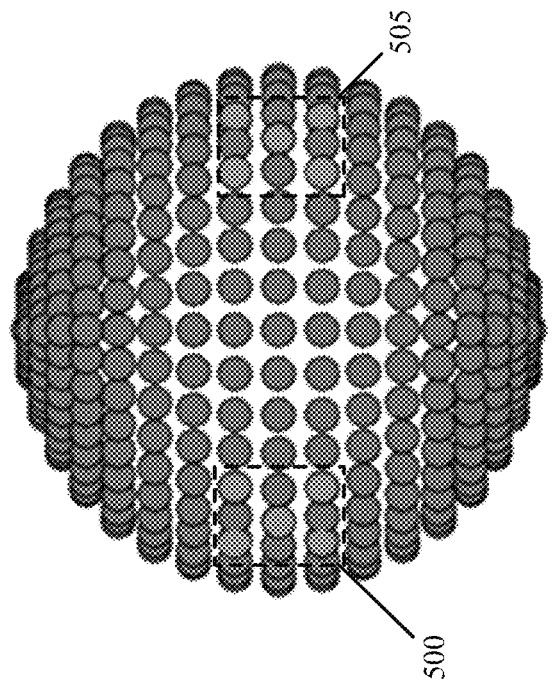
FIGS. 5A and 5B illustrate examples antenna local groups in accordance with some embodiments of the present disclosure.
Figure 5B:
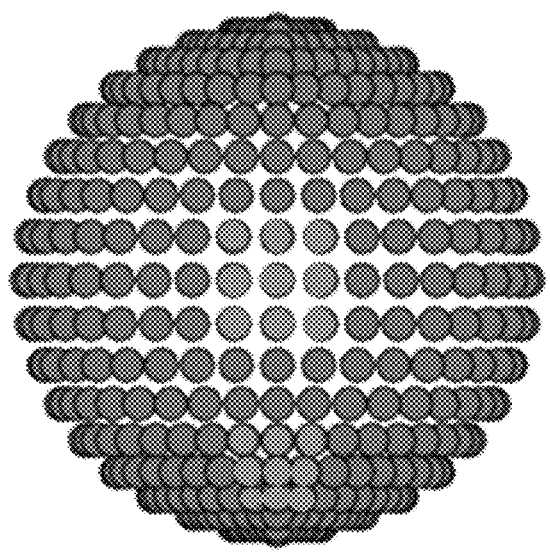

FIGS. 5A and 5B illustrate examples of an antenna local group in accordance with some embodiments of the present disclosure. Antenna array 315 can have an overall circular layout. Within the circular layout, the individual antenna elements can be arranged in a straight line. In some embodiments, the individual antenna elements can be arranged along a curve line such as a spiral. Antenna array 315 can have a plurality of local groups. Each group can have a different layout pattern. Alternatively, each group has the same layout pattern.

In FIG. 5A, an antenna local group can have 5 antenna elements having a five-dot configuration as shown. Antenna array 315 can have a plurality of 5-dot local groups (i.e., 500 and 510). Beamforming can be achieved by activating in phase (sequence) of one or more local groups. Additionally, within each 5-dot local group, each individual antenna element can be activated based on a phase gradient or pattern. For example, in the 5-dot configuration, the upper left dot could be activated first, then the 3 dots between the upper left dot and the lower right dot can be activated simultaneously. Lastly, the lower right dot can be activated last.

In FIG. 5B, the local group of antenna array 315 can have a 6-dot arrangement as shown. Other arrangement is possible within the circular layout such as a spiraling pattern (not shown). Each antenna element can be a part of one or more local groups. In other words, local groups can have overlapping portions. Each local group can have 2-100 antenna elements.

FIG. 6 illustrates examples of arrangement of antenna elements of a local group in accordance with some embodiments of the present invention. Antenna array 315 can have a plurality of local groups 605a, 605b, and 605c, each can have a 7-dot arrangement as shown. Although only three local groups 605 are shown, local group 605 can fill a portion of or the entire antenna array 315.

In some embodiments, one or more local groups of antenna array 315 can have a 7-dot arrangement as shown in local group 610. In this embodiments, it can be desirable to space antenna elements farther apart within a local group when the size of each antenna elements is very small. Antenna array can have multiple local groups 610 to fill out the entire array. One or more antenna elements of one local group 610 can also be assigned to one or more other local groups 610. In this way, more local groups 610 can be created within antenna array 315. As previously mentioned, a local group can have different shapes and number of antenna elements. For example, local group 615 has a diamond shape with 9 antenna elements.

Figure 7A:
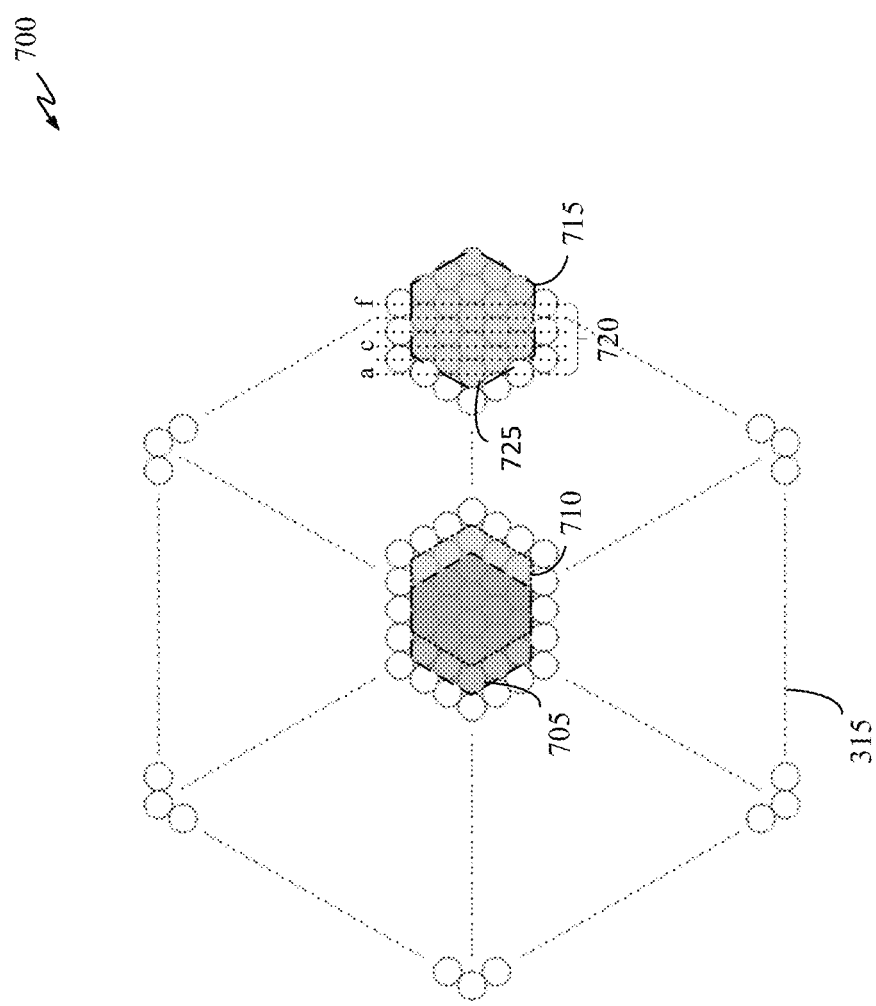
FIGS. 7A and 7B illustrate an example activation pattern of one or more local groups in accordance with some embodiments of the present disclosure.

FIG. 7A graphically illustrates a beamforming process 700 in accordance with some embodiments of the present disclosure. Antenna array 315 includes a plurality of antenna local groups 705, 710, and 715. Although only three antenna local groups are shown, antenna array 315 can have many more overlapping antenna local groups between local groups 710 and 715. As shown, local groups 705 and 710 have overlapping antenna elements. Local group 710 is basically local group 705 but shifted to the right by one antenna element. Antenna array 315 can have many more local groups shifted in any one direction. For example, another local group next to local group after 710 would be a local group shifted by one antenna element to the right. A local group after that would be next local group shifted by another antenna element spacing, and so on until local group 715 is formed.

Each local group can be activated based on an activation pattern. Each antenna element within a local group can be activated based on an antenna element activation pattern and/or a phase gradient. For example, once a local group is activated, one or more antenna elements can be activated based on a timing pattern or a phase gradient. For instance, referring to local group 715, activation pattern 720 (dotted lines a-f) represents an activation order for local group 715. Within local group 715, all antenna elements falling on line 'a' would activate first, this would be just antenna element 725. Next, all antenna elements falling on line 'b' would fire, then line 'c', and so forth. In some embodiments, all antenna elements within a local group can be activated simultaneously. Although activation pattern 720 is shown to have a line-by-line activation pattern (e.g., left-to-right, top-to-bottom), other activation patterns can be used such as, but not limited to, an outer-to-inner, an inner-to-outer, or a circular activation pattern.

Figure 7B:
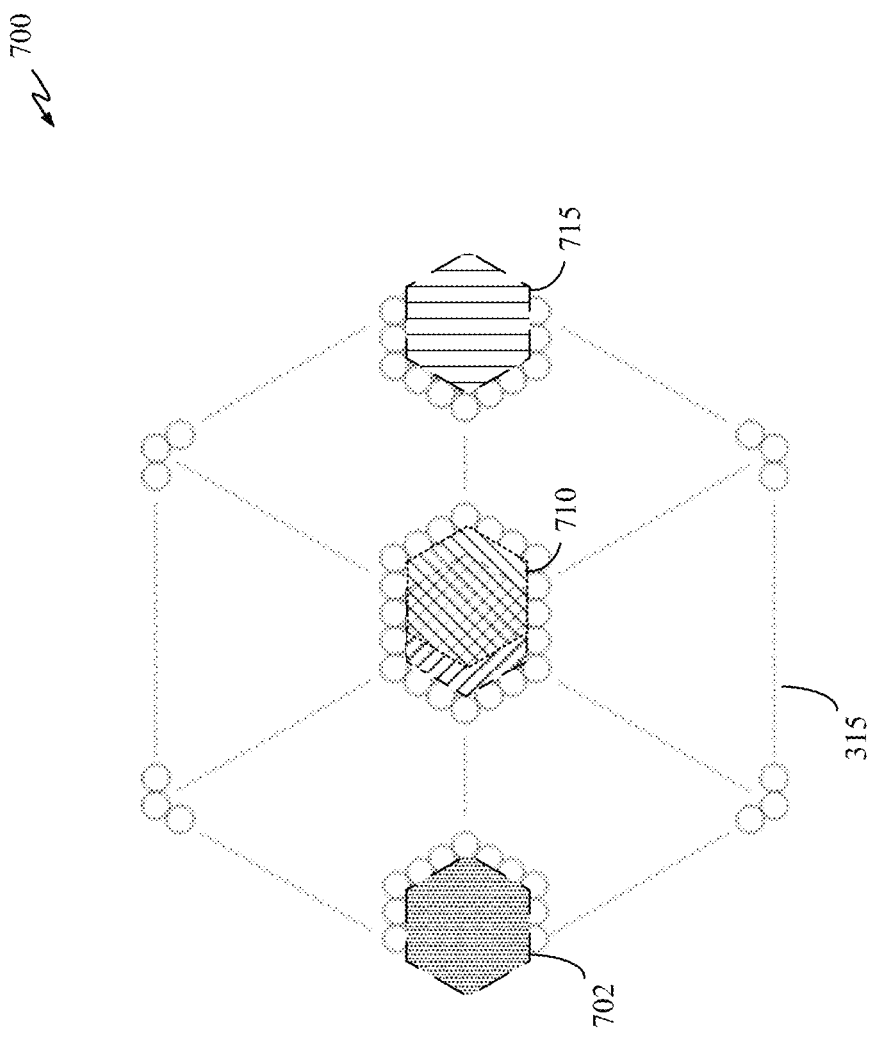
Figure 8:
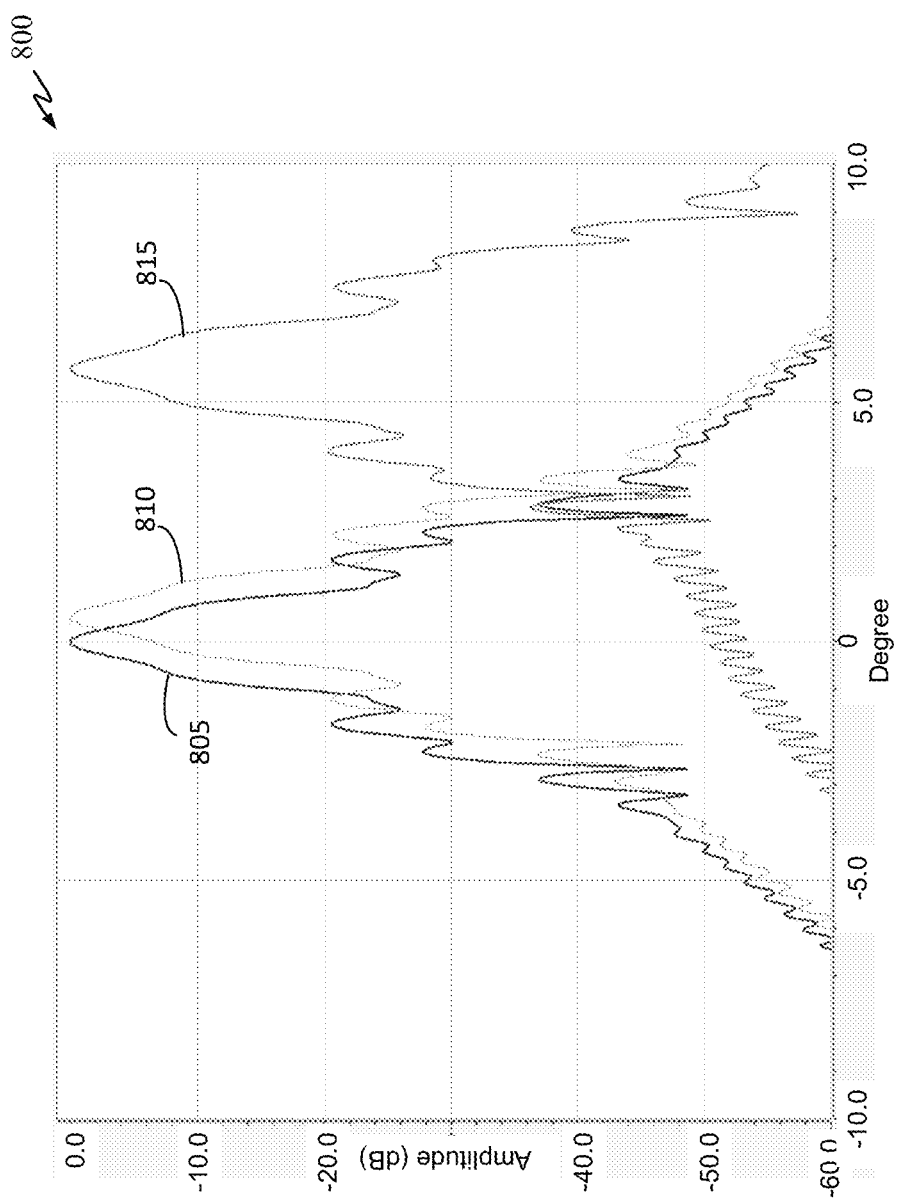
FIG. 8 illustrates an example gain chart in accordance with some embodiments of the present disclosure.

FIG. 8 illustrates a gain chart 800 generated using spherical reflector antenna 300 in accordance with some embodiments of the present disclosure. Gain chart 800 includes three gain profiles 805, 810, and 815. Gain profile 805 is generated with data from local group 705 (FIG. 7) using a beamforming process. Gain profile 810 is generated with data from local group 710 using the same beamforming process. Similarly, gain profile 810 is generated with data from local group 715.

The half-power beam width (HPBW) for each of the gain profiles 805, 810, and 815 is 0.6° degree, 0.3° degree from the center of the beam on each side. However, signals from multiple local groups between 702 and 715 (e.g., all possible local groups between local group 702 and 715) can be combined to obtain a cumulative gain profile having a HPBW of 12.04° degrees (±6.02° degrees. In other words, beamforming process 700 can collect data for a wide field of view (e.g., ±6.02° degrees) by activating all local groups between local groups 702 and 715 based on a phase gradient or activation pattern. By only using the HPBW signals from each local group, beamforming process 700 can obtain signals with minimum to zero interference with a wide field of view.

Figure 9:
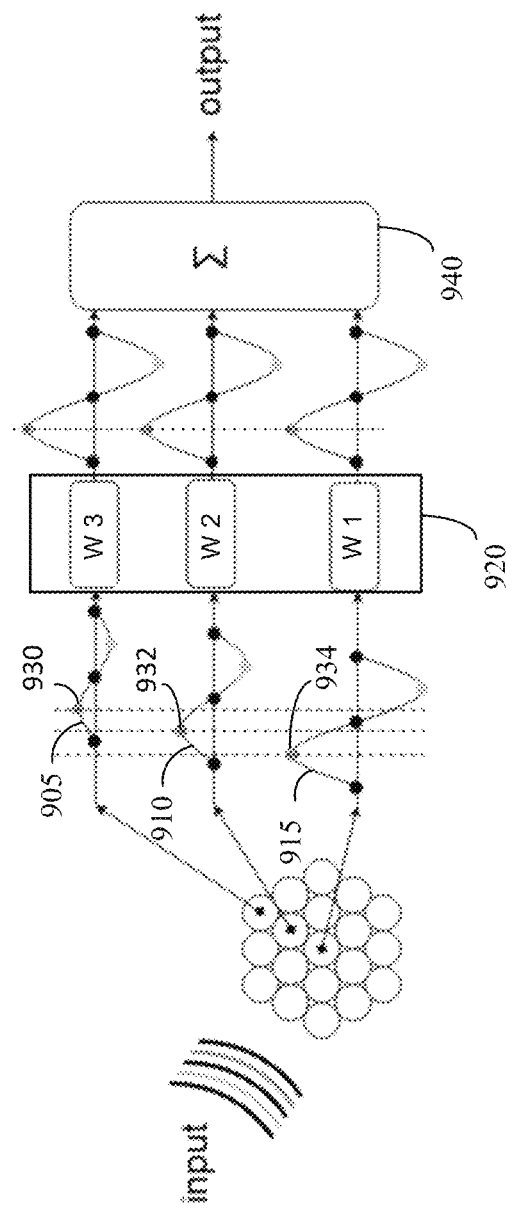
FIG. 9 is a graphical illustration of a beamforming process in accordance with some embodiments of the present disclosure.

FIG. 9 graphically illustrates a beamforming process 900 that is configured to electronically compensates for spherical aberration in accordance with some embodiments of the present invention. As shown in FIG. 3, the amplitude and phase of the electromagnetic (EM) radiation detected by each array element can be unequal due to the differences in relative orientation and travel distance between the elements and various points of the EM wavefront prior to entering the aperture of spherical reflector 305.

As shown in FIG. 9, waveforms 905, 910, and 915 can have different phases and amplitude as they are detected by their respective antenna element. These output EM waves are then ingested by a compensation module 920, which can be a part of a beamforming module. Compensation module 920 can assign one or more weight modification attributes to each antenna element based at least on the location of each antenna element on spherical feed 310. The weight modification attributes can modify the phase and/or amplitude of EM waves from each antenna element.

As shown, data points 930, 932, and 934 of EM waves 905, 910, and 915, respectively, are not time synchronized and have different amplitudes. Given a set of weights, the EM waves exiting compensating module 920 entering summation module 940 would (in some combination) constructively or destructively interfere. In this example, a full constructive interference is shown. After compensation, EM waves 905, 910, and 915 are in phase with each other and have similar amplitude. This occurs because compensation module 920 have selected a weight for each antenna element such that the beam would be directed in the direction of the EM waves. Otherwise, destructive interference would dominate to cause a zero output. Similar beamforming process can be performed with other array elements. For example, a phase gradient can be applied to modify the weights of one or more local groups and steer the beam to a range of angles not covered by local groups with unmodified weights. In this way, through the selection of the weights, spherical aberration can be compensated and minimized.

Figure 10:
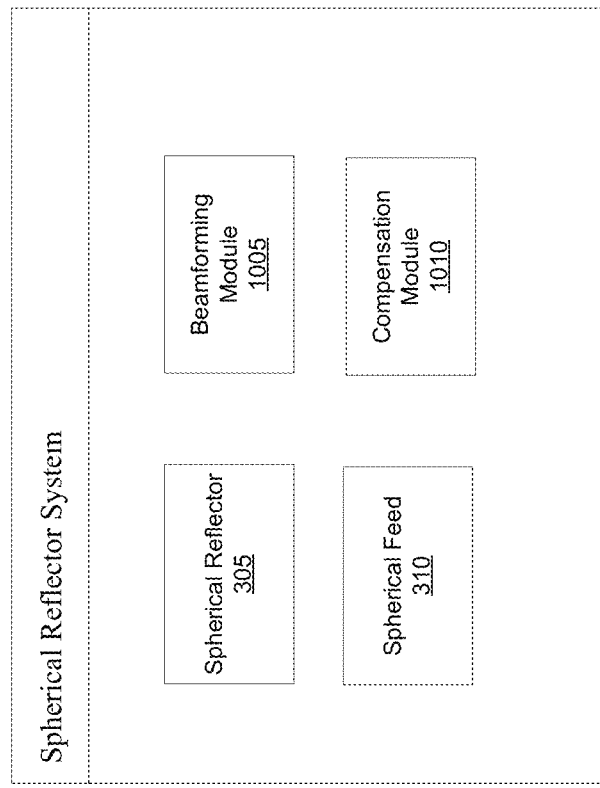
FIG. 10 is a block diagram of an example spherical reflector system in accordance with some embodiments of the present disclosure.

FIG. 10 illustrates an example spherical reflector system 1000 in accordance with some embodiments of the present disclosure. Spherical reflector system 1000 includes spherical reflector 305, spherical feed 310, a beamforming module 1005, and a compensation module 1010. Spherical feed 310 can include antenna array 315 as described with respect to FIGS. 3, 4A, 4B, 4C, 5A, 5B, 6, 7A, 7B, and 9.

Beamforming module 1005 can include a combination of hardware and software with instructions that, when executed by one or more processors, cause the one or more processors to perform the beamforming functions as described with respect to FIGS. 3, 4A, 4B, 4C, 5A, 5B, 6, 7A, 7B, 8, and 9.

Compensation module 1010 can include a combination of hardware and software with instructions that, when executed by one or more processors, cause the one or more processors to perform the functions of compensation module 940 as described with respect to FIG. 9. Compensation module 1010 and beamforming module 1005 can be combined and function as a single module.

System Architecture

Figure 11:
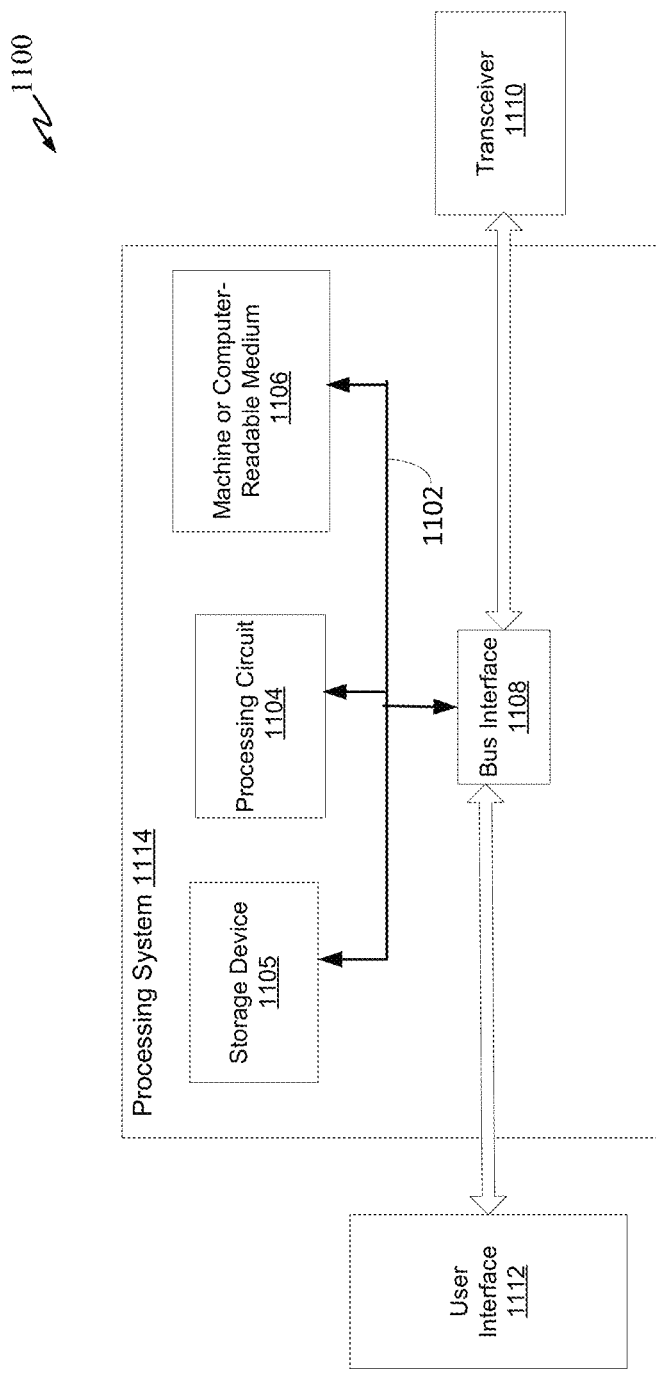
FIG. 11 is a block diagram illustrating an example system architecture of the spherical reflector system of FIG. 10 in accordance with some embodiments of the present disclosure.

FIG. 11 illustrates an exemplary overall system or apparatus 1100 in which 300 and 1100 can be implemented. In accordance with various aspects of the disclosure, an element, or any portion of an element, or any combination of elements may be implemented with a processing system 1114 that includes one or more processing circuits 1104. Processing circuits 1104 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 1104 may be used to implement any one or more of the processes described above and illustrated in FIGS. 3, 5, 6A, 7, 8, 11, 11, and 12.

In the example of FIG. 11, the processing system 1114 may be implemented with a bus architecture, represented generally by the bus 1102. The bus 1102 may include any number of interconnecting buses and bridges depending on the specific application of the processing system 1114 and the overall design constraints. The bus 1102 may link various circuits including one or more processing circuits (represented generally by the processing circuit 1104), the storage device 1105, and a machine-readable, processor-readable, processing circuit-readable or computer-readable media (represented generally by a non-transitory machine-readable medium 1109). The bus 1102 may also link various other circuits such as timing sources, peripherals, voltage regulators, and power management circuits, which are well known in the art, and therefore, will not be described any further. The bus interface 1108 may provide an interface between bus 1102 and a transceiver 1113. The transceiver 1110 may provide a means for communicating with various other apparatus over a transmission medium. Depending upon the nature of the apparatus, a user interface 1112 (e.g., keypad, display, speaker, microphone, touchscreen, motion sensor) may also be provided.

The processing circuit 1104 may be responsible for managing the bus 1102 and for general processing, including the execution of software stored on the machine-readable medium 1109. The software, when executed by processing circuit 1104, causes processing system 1114 to perform the various functions described herein for any particular apparatus. Machine-readable medium 1109 may also be used for storing data that is manipulated by processing circuit 1104 when executing software.

One or more processing circuits 1104 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

For example, instructions (e.g., codes) stored in the non-transitory computer readable memory, when executed, may cause the one or more processors to: segment a training data set into a plurality of segments; identify patterns within each of the plurality of segments; and generate a statistical model representing probability relationships between identified patterns.

The software may reside on machine-readable medium 1109. The machine-readable medium 1109 may be a non-transitory machine-readable medium. A non-transitory processing circuit-readable, machine-readable or computer-readable medium includes, by way of example, a magnetic storage device (e.g., solid state drive, hard disk, floppy disk, magnetic strip), an optical disk (e.g., digital versatile disc (DVD), Blu-Ray disc), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1109 may reside in the processing system 1114, external to the processing system 1114, or distributed across multiple entities including the processing system 1114. The machine-readable medium 1109 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the one or more processors such that the one or more processors can read information from, and write information to, the storage medium. In the alternative, the storage medium may be integral to the one or more processors.

CONCLUSION

The enablements described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

The invention claimed is:

1. An antenna system comprising:
   a main spherical reflecting dish; and
   a spherical feed having a plurality of antenna elements disposed on a spherical surface of the spherical feed forming a non-planer antenna array having a distribution pattern, wherein the spherical feed is disposed on an axis of the main spherical reflecting dish, the distribution pattern having a spiraling pattern,
   wherein the antenna system is configured to compensate for spherical aberration using a compensation module that adjusts the weights of each antenna element based on the antenna element's location on the spherical feed, compensating for the differences in relative orientation and travel distance of the elements to minimize spherical aberration.

2. The antenna system of claim 1, wherein the plurality of antenna elements is disposed on a convex surface of the spherical surface facing the main spherical reflecting dish.

3. The antenna system of claim 1, wherein the plurality of antenna elements is disposed on the convex surface that is no more than half a size of a sphere.

4. The antenna system of claim 3, further comprising a beamforming module configured to activate one or more groups of antenna elements of the plurality of antenna elements based at least on a scanning sequence.

5. The antenna system of claim 3, further comprising a beamforming module configured to activate one or more antenna elements within a group of antenna based at least on a scanning sequence.

6. The antenna system of claim 1, further comprising a beamforming module configured scan a portion of the main spherical reflecting dish by activating one or more groups of antenna elements of the plurality of antennas.

7. The antenna system of claim 6, wherein the beamforming module is configured to scan a portion of the main spherical reflecting dish by activating the one or more groups of antenna elements of the plurality of antennas based at least on a phase gradient.

8. The antenna system of claim 6, wherein the beamforming module is configured to activate one or more groups of antenna elements of the plurality of antennas based at least on a frequency band of signals to be detected.

9. The antenna system of claim 6, wherein the beamforming module comprises analog amplifiers and phase-shifters or digital amplifiers and phase-shifters.

10. The antenna system of claim 6, wherein the beamforming module comprises digital amplifiers and phase-shifters.

11. The antenna system of claim 1, wherein the plurality of antenna elements are arranged in a 3D spherical shape.

12. The antenna system of claim 1, the main spherical reflecting dish having a spherical reflective surface on an inner surface of the main spherical reflecting dish.

13. The antenna system of claim 1, wherein the distribution pattern having the spiraling pattern comprises a combination of the spiraling pattern and at least one of a hexagonal pattern or a polygonal pattern.

14. A spherical reflector antenna system comprising:
a main spherical reflector;
a plurality of antenna elements disposed on a spherical surface of a spherical feed, the plurality of antenna elements configured to receive reflected electromagnetic waves from the main spherical reflector, the plurality of antenna elements disposed on the spherical surface of the spherical feed having a spiraling pattern; and
a beamforming module configured to activate one or more groups of antenna elements of the plurality of antenna elements based at least on an activation pattern,
wherein the spherical reflector antenna system is configured to employ beamforming techniques to electronically steer the array and compensate for spherical aberration by activating different local groups in a phased manner to achieve a wide field of view with minimal interference.

15. The spherical reflector antenna system of claim 14, wherein the plurality of antenna elements is disposed on a convex surface of the spherical surface facing the main spherical reflecting dish, and wherein the convex surface comprises a surface area no more than half of a surface area of a sphere.

16. A spherical reflector antenna system comprising:
a main spherical reflector;
a plurality of antenna elements disposed on a spherical surface of a spherical feed, the plurality of antenna elements configured to receive reflected electromagnetic waves from the main spherical reflector, the plurality of antenna elements disposed on the spherical surface of the spherical feed having a spiraling pattern; and
a beamforming module configured to activate one or more groups of antenna elements of the plurality of antenna elements based at least on an activation pattern, wherein the spherical reflector antenna system is configured to compensate for spherical aberration using a compensation module that adjusts the weights of each antenna element based on the antenna element's location on the spherical feed, compensating for the differences in relative orientation and travel distance of the elements to minimize spherical aberration.

17. An antenna system comprising:
a main spherical reflecting dish; and
a spherical feed having a plurality of antenna elements disposed on a spherical surface of the spherical feed forming a non-planer antenna array having a distribution pattern, wherein the spherical feed is disposed on an axis of the main spherical reflecting dish, the distribution pattern having a spiraling pattern, wherein the antenna system is configured to employ beamforming techniques to electronically steer the array and compensate for spherical aberration by activating different local groups in a phased manner to achieve a wide field of view with minimal interference.

* * * * *